(12) United States Patent
Holm et al.

(10) Patent No.: US 10,466,063 B2
(45) Date of Patent: *Nov. 5, 2019

(54) METHOD, APPARATUS, AND COMPUTER PROGRAM PRODUCT FOR PROVIDING ACCESS TO A MEDIA ITEM BASED AT LEAST IN PART ON A ROUTE

(71) Applicant: Nokia Technologies Oy, Espoo (FI)

(72) Inventors: Jukka Antero Holm, Tampere (FI); Antti Eronen, Tampere (FI); Arto Juhani Lehtiniemi, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/878,097

(22) Filed: Jan. 23, 2018

(65) Prior Publication Data
US 2018/0149490 A1  May 31, 2018

Related U.S. Application Data

(63) Continuation of application No. 15/169,285, filed on May 31, 2016, now Pat. No. 9,885,583, which is a
(Continued)

(51) Int. Cl.
*H04W 4/024* (2018.01)
*G01C 21/36* (2006.01)
(Continued)

(52) U.S. Cl.
CPC ..... *G01C 21/3682* (2013.01); *G01C 21/3629* (2013.01); *G01C 21/3647* (2013.01);
(Continued)

(58) Field of Classification Search
CPC ....... H04W 4/02; H04W 4/021; H04W 4/023; H04W 4/0225; H04W 4/04
(Continued)

(56) References Cited

U.S. PATENT DOCUMENTS 5,291,413 A * 3/1994 Tamai ............... G01C 21/3415
340/990
6,347,278 B2 2/2002 Ito
(Continued)

FOREIGN PATENT DOCUMENTS

EP         1111342 A2    6/2001
WO      2006069594 A1    7/2006

OTHER PUBLICATIONS

Office Action for related European Patent Application No. 12178906.9-1505 dated Mar. 8, 2016, 7 Pages.
(Continued)

*Primary Examiner* — Jean A Gelin
(74) *Attorney, Agent, or Firm* — Ditthavong & Steiner, P.C.

(57) ABSTRACT

An apparatus for providing access to a media item based at least in part on a route may include a processor. The processor may be configured to receive a start location of a mobile device. The processor may be further configured to receive a route. In this regard, the route may have been determined based at least in part on points of interest and the start location. The processor may be further configured to provide for access to a media item if a current location of the mobile device remains on the route. Associated methods and computer program products may also be provided.

20 Claims, 8 Drawing Sheets

Related U.S. Application Data continuation of application No. 13/479,837, filed on May 24, 2012, which is a continuation of application No. 12/244,378, filed on Oct. 2, 2008, now Pat. No. 8,208,941.

(51) Int. Cl.
| | |
|---|---|
| *G06Q 30/02* | (2012.01) |
| *G11B 27/10* | (2006.01) |
| *H04M 3/42* | (2006.01) |
| *H04L 29/08* | (2006.01) |
| *G01S 19/42* | (2010.01) |

(52) U.S. Cl.
CPC .............. *G01S 19/42* (2013.01); *G06Q 30/02* (2013.01); *G11B 27/105* (2013.01); *H04L 67/18* (2013.01); *H04M 3/42348* (2013.01); *H04W 4/024* (2018.02); *H04M 2242/30* (2013.01)

(58) Field of Classification Search
USPC ... 455/456.1, 457, 566, 404.2, 456.2, 456.3, 455/456.6; 340/990, 991, 993, 995.1, 340/995.12, 995; 701/408, 410, 485, 513, 701/517, 527; 342/357.64, 357.09
See application file for complete search history.

(56) References Cited

U.S. PATENT DOCUMENTS

| | | | |
|---|---|---|---|
| 6,552,682 B1 | 4/2003 | Fan | |
| 6,862,524 B1 | 3/2005 | Nagda et al. | |
| 7,461,528 B2 | 12/2008 | Taniguchi et al. | |
| 7,890,259 B2 * | 2/2011 | Kamdar | G01C 21/3608 340/995.1 |
| 7,912,638 B2 | 3/2011 | Devries et al. | |
| 8,010,285 B1 | 8/2011 | Denise | |
| 8,208,941 B2 | 6/2012 | Holm et al. | |
| 2001/0034220 A1 | 10/2001 | Berstis | |
| 2002/0065604 A1 | 5/2002 | Sekiyama | |
| 2003/0036848 A1 * | 2/2003 | Sheha | G01C 21/3679 701/468 |
| 2005/0096839 A1 * | 5/2005 | Nakano | G01C 21/3694 701/532 |
| 2005/0149253 A1 * | 7/2005 | Nambata | G01C 21/34 701/533 |
| 2006/0080034 A1 | 4/2006 | Hayashi | |
| 2006/0277187 A1 | 12/2006 | Roese et al. | |
| 2007/0015520 A1 | 1/2007 | Casey | |
| 2007/0156334 A1 | 7/2007 | Vu | |
| 2009/0034726 A1 | 2/2009 | Williams et al. | |
| 2009/0171562 A1 * | 7/2009 | Shimada | G01C 21/3415 701/533 |
| 2009/0282353 A1 * | 11/2009 | Halbherr | G01C 21/3679 715/769 |
| 2010/0063726 A1 * | 3/2010 | Marjenberg | G01C 21/00 701/408 |
| 2010/0085947 A1 | 4/2010 | Ringland et al. | |
| 2010/0269059 A1 | 10/2010 | Othmer et al. | |
| 2010/0332299 A1 | 12/2010 | Herbst et al. | |
| 2011/0106426 A1 | 5/2011 | Tertoolen | |
| 2011/0161002 A1 | 6/2011 | Devries et al. | |
| 2011/0173067 A1 | 7/2011 | Herbst et al. | |
| 2012/0029821 A1 * | 2/2012 | Nesbitt | G01C 21/367 701/527 |

OTHER PUBLICATIONS

Chinese Office Action for related Chinese Patent Application No. 200910174122.1 dated Jul. 16, 2013, with English-language summary, 8 Pages.

European Office Action for related European Patent Application No. 12178906 dated Nov. 23, 2012, 8 Pages.

Chinese Office Action for related Chinese Patent Application No. 200910174122.1 dated Dec. 18, 2012, 10 Pages.

European Office Action for related European Patent Application No. 09170821.4 dated Aug. 31, 2012, 5 Pages.

Chinese Office Action for related Chinese Patent Application No. 200910174122.1 dated Apr. 11, 2012, pp. 1-12.

European Office Action for related European Patent Application No. 09170821.4 dated Jun. 12, 2012, 6 Pages.

Extended European Search Report for related European Patent Application No. 09170821.4-1525 dated Dec. 29, 2009, 7 Pages.

Office Action for related Chinese Patent Application No. 2016108303779, dated Jan. 17, 2019, 9 pages.

Office Action for related Chinese Patent Application No. 201610830377. 9, dated Jul. 11, 2019, English Language Summary Included, 10 pages.

\* cited by examiner

METHOD, APPARATUS, AND COMPUTER PROGRAM PRODUCT FOR PROVIDING ACCESS TO A MEDIA ITEM BASED AT LEAST IN PART ON A ROUTE

CROSS-REFERENCE TO RELATED APPLICATION

This application is a continuation of U.S. patent application Ser. No. 15/169,285 (now U.S. Pat. No. 9,885,583), filed on May 31, 2016, entitled "Method, Apparatus, and Computer Program Product for Providing Access to a Media Item Based at least in Part on a Route," which is a continuation of U.S. patent application Ser. No. 13/479,837, filed on May 24, 2012, entitled "Method, Apparatus, and Computer Program Product for Providing Access to a Media Item Based at least in Part on a Route," which is a continuation of U.S. patent application Ser. No. 12/244,378 (now U.S. Pat. No. 8,208,941), filed on Oct. 2, 2008, entitled "Method, Apparatus, and Computer Program Product for Providing Access to a Media Item Based at least in Part on a Route," the entirety of which is incorporated herein by reference.

TECHNICAL FIELD

Embodiments of the present invention relate generally to accessing media content and, more particularly, relate to an apparatus, method, and computer program product for providing access to a media item in association with location information.

BACKGROUND

The modern communications era has brought about a tremendous expansion of wireline and wireless networks. Various types of networking technologies have been developed resulting in unprecedented expansion of computer networks, television networks, telephony networks, and the like, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile communication devices and other computing devices. However, as the ease of information transfer increases, users and businesses continue to demand more functionality from communications devices, particularly mobile communications devices.

In the past, mobile communications devices mainly consisted of cellular telephones capable of conducting only analog voice communications. As mobile communications devices have evolved and become more ubiquitous, expanded communications capabilities, as well as secondary functionality have been made available to users via their mobile communications devices. For example, while many mobile communications devices still provide for primary functionality, such as voice call communications capabilities, many mobile communications devices also provide for music and video playing capabilities, photo and video capturing, location identification and destination routing, and the like.

With the wide variety of functionality that is now available on many mobile communications devices, users are continuously desiring and demanding new and different applications that utilize this functionality. Further, as users become more dependant upon mobile communications devices as part of their everyday life, businesses have begun recognizing the potential for utilizing mobile communications devices as platforms for marketing and advertising goods and services.

BRIEF SUMMARY

A method, apparatus, and computer program product are described that provide for accessing a media item based at least in part on a route. Exemplary embodiments of the present invention may receive a start location of a mobile device having location identification capabilities. In this regard, it may be assumed that the location of the mobile device may be associated with the location of a user of the mobile device. Exemplary embodiments of the present invention may also receive a route. The route may have been determined based at least in part on the start location and points of interest. The points of interest may be landmarks, such as businesses, that are positioned along the route. Further, exemplary embodiments may provide for access to a media item if a current location of the mobile device remains on the route. In this regard, a user may experience a media item while moving along the route, possibly free of charge to the user. By following the route, the user may be forced to pass the points of interest, which provides for advertising and marketing opportunities for businesses associated with the points of interest on the route. In some embodiments, if the user, and in turn the mobile device, deviates from the route, access to the media item may be revoked thereby encouraging the user to follow the route and pass the points of interest.

Accordingly, in one exemplary embodiment, a method for providing access to a media item based at least in part on a route is described. The method may include receiving a start location of a mobile device and receiving a route. In this regard, the route may have been determined based at least in part on points of interest and the start location. The method may also include providing for access to a media item if a current location of the mobile device remains on the route.

In another exemplary embodiment, an apparatus for providing access to a media item based at least in part on a route is described. The apparatus may include a processor that may be configured to receive a start location of a mobile device and receive a route. The route may have been determined based at least in part on points of interest and the start location. The processor may also be configured to provide for access to a media item if a current location of the mobile device remains on the route.

In another exemplary embodiment, a computer program product for providing access to a media item based at least in part on a route is described. The computer program product may include at least one computer-readable storage medium having computer-readable program code instructions stored therein. The computer-readable program code instructions may include first program code instructions, second program code instructions, and third program code instructions. The first program code instructions may be configured to receive a start location of a mobile device and the second program code instructions may be configured to receive a route. The route may have been determined based at least in part on points of interest and the start location. The third program code instructions may be configured to provide for access to a media item if a current location of the mobile device remains on the route.

In yet another exemplary embodiment, an apparatus for providing access to a media item based at least in part on a route is described. The apparatus may include means for receiving a start location of a mobile device and means for receiving a route. In this regard, the route may have been determined based at least in part on points of interest and the start location. The apparatus may also include means for providing for access to a media item if a current location of the mobile device remains on the route.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
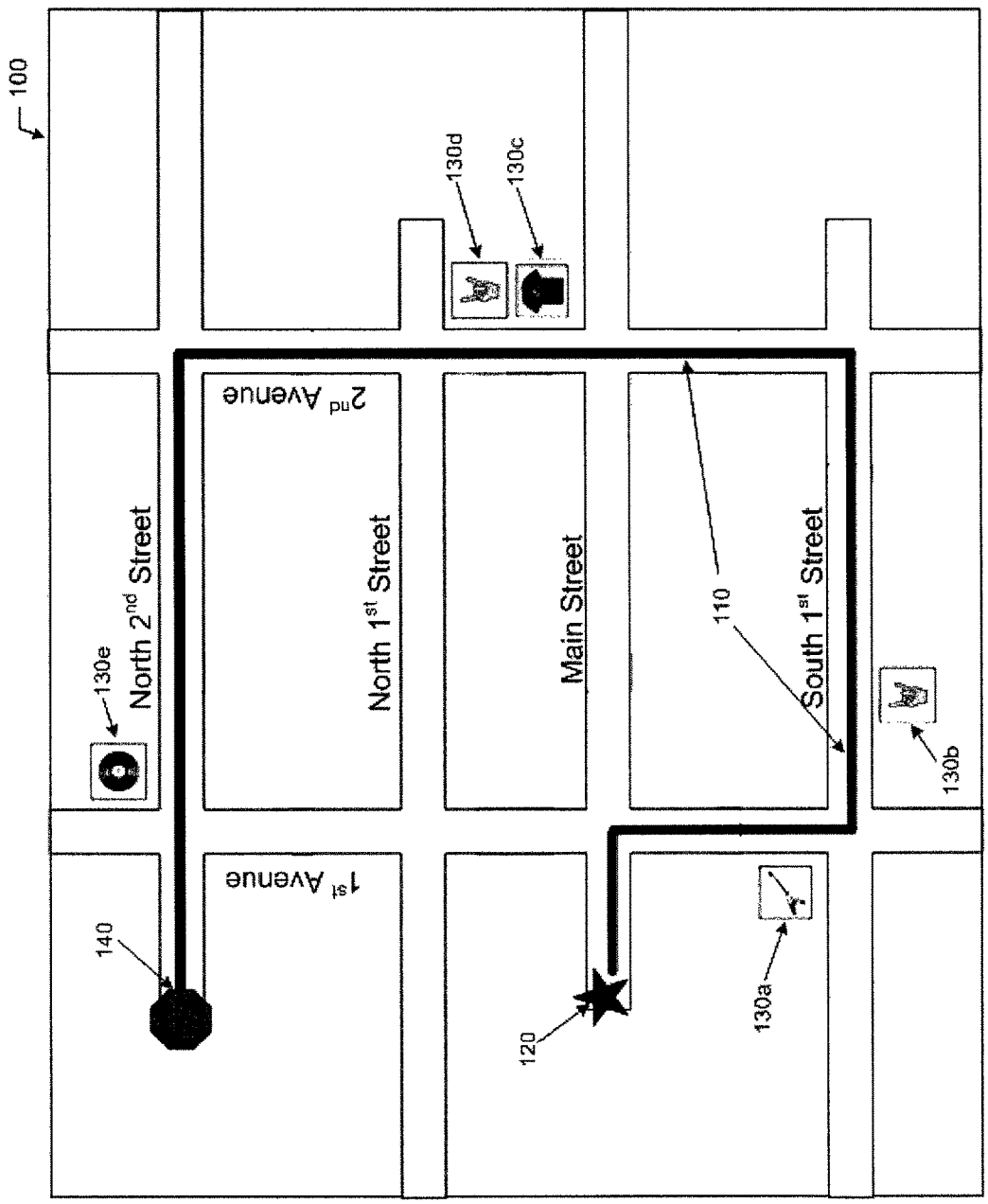
FIG. 1 is an illustration of a map with an example route according to various exemplary embodiments of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, operated on, and/or stored in accordance with embodiments of the present invention. Moreover, the term "exemplary," as used herein, is not provided to convey any qualitative assessment, but instead to merely convey an illustration of an example. The term "media item," as used herein, may refer to an audio, video or other media item including, but not limited to, a music track, a song, an album, an audio book, a radio program, a podcast, a video clip, a movie, a television program, a website, or a blog. As used herein, "playing" a media item may refer to implementing the media item in manner that would allow a user to experience the media item (e.g., playing a song, displaying a photo, displaying a website, etc.).

Exemplary embodiments of the present invention provide for a location and advertisement based media item accessing service. Users of the service may be granted access to, for example, free media items for playback as long as the users follow (e.g., walk, bike, drive, or otherwise travel) a route specified by the service. The route may be included in a map, and displayed on the user's mobile device. The route may be generated based at least in part on points of interest (POIs). In this regard, the route may be configured to force the user to pass various POIs while traveling the route. The POIs may be landmarks such as businesses (e.g., restaurants, bars, clothing stores, music stores, and other commercial establishments), attractions (e.g., historical landmarks, parks, amusement parks, scenic locations), or the like. In some exemplary embodiments, the media item or items that a user is provided access to while traveling the route may be related to the POIs, such as, through a common theme, a common target demographic (e.g., individuals that enjoy the media item also tend to shop at a particular clothing store that is a POI), the media item may describe or provide information about the POI, or the like. If the user does not follow the specified route, and thus does not walk past the POIs, access to the media item may be revoked. In this regard, the service may perform an advertising or marketing function, since the service may cause potential consumers to pass by business locations that the potential consumers may not have otherwise passed. Further, the display of the route on the user's mobile device may include indicators or icons to the POIs, which may identify the location of a POI and also provide a link to receive additional information about the POI. Further, businesses may add their locations as POIs to the map by entering into a financial agreement with the provider of the service in order to have the POI defined in the service.

FIG. 1 is an illustration of a map 100 with an example route 120 according to various exemplary embodiments of the present invention. The map 100 of FIG. 1 is displayed in combination with the exemplary route 120, a start location 120, POI indicators 130 (e.g., POI indicator 130a, POI indicator 130b, POI indicator 130c, POI indicator 130d, and POI indicator 130e), and a destination location 140. The map 100 may also include an indication of the user's current location as the user travels along the route 120. In some exemplary embodiments, the map 100 may also include indicators of other users that may be traveling the same route. The map 100 may be depicted on a display of a mobile device, as further described below. The mobile device may implement any conventional geographic mapping software to provide for the display of the map 100.

In this regard, a user's mobile device with location identification capabilities (e.g., global positioning system (GPS) capabilities) and media item playing capabilities, as further described below, may be configured to identify the current location of the device, and thereby identify the current location of the user. The current location of the device/user may be the start location 120. The start location 120 and possibly other information may be inputs into a conventional route determination engine to determine a route. In this regard, any known mechanism for receiving locational inputs, in the form of, for example, a start location, and end location, and intermediate destination locations may be implemented for determining a route. In some exemplary embodiments, the end location may be defined, for example, by a user inputting a target address, and the route may be calculated based at least in part on the end location. For example, a user traveling to a neighboring town may define the target end location address and a route may be determined from the user's current location to the target end location.

Further, the route 120 may be determined based at least in part on the locations of POIs. In this regard, the service may select suitable POIs for inclusion in the route. Suitable POIs may be identified from all available POIs based at least in part on various criteria as further described below. If a threshold number of suitable POIs are not identified, then the service need not be made available to the user. Criteria used to identify suitable POIs may be determined automatically or may be determined based at least in part on input from a user.

Suitable POIs may be determined based at least in part on the start location. The POIs may be intermediate or destinations of the route. In this regard, POIs near the start location, or near the start location 120 and destination location 140, may be identified as being possible locations to use in determining the route 110. In various exemplary embodiments of the present invention, the route 110 may also be determined based upon inputs such as a distance from the start location. In this regard, for example, a user may wish to walk one mile while listening to a particular media item. Based at least in part on this information, suitable POIs may be identified. Further, suitable PIOs may be identified based at least in part on an amount of time provided by the user, or the duration of media item or media items.

Suitable POIs may also be determined, for example, based at least in part on the time of day. In this regard, if the current time is outside of the operating hours for a business associated with a POI, then the POI may not be a suitable POI. For example, bars and discotheques are often only open at night, and as such, POIs associated with bars and discotheques might be suitable POIs only at night.

In some exemplary embodiments, the form of travel may be a criterion considered in determining suitable POIs. For example, some POIs may be identified as suitable when the user is traveling by foot, because the POIs may be most readily visited by foot, while other POIs may be identified as suitable because the user is traveling by car or bicycle.

Suitable POIs may also be determined based at least in part on a user profile associated with a user. In some exemplary embodiments, user profiles may be stored at a service or otherwise accessible to a service. Utilizing user profile information in identifying suitable POIs and designing the route may have the benefit that the POIs will likely to be interesting to the user and have a higher likelihood of leading to a transaction (purchase, visit, etc).

A user profile may contain information with regard to user preferences for music (e.g., favorite genre), places (e.g., the location of home or a friend's homes), food, clothes, gadgets, old routes visited, events (e.g., sports events or concerts attended) and so on. The user profile information may be inputted to the service by the user himself and/or the service may determine the user's preferences over time based at least in part on information captured by the service regarding the user's activities. For example, when a user purchases goods, for example, online, the service may capture information regarding the purchase, such as the type of goods purchased or the amount spent, and the service may determine purchasing trends or commonly purchased products. Further, when a user attends an event such as sporting event or concert, the service may capture associated information and determine that the user prefers particular types of events.

To be able to detect that a user attends an event, the service may be configured to use information from, for example, a map database and analyze location information describing the current location of the user (e.g., GPS coordinates provided by a GPS equipped mobile terminal) with respect to the location information of a place of business (e.g., pizza restaurant) to determine the activities of the user. Further, the current location of the user and the current time may also be analyzed with respect to an event database which has information regarding various events (e.g., a rock concert at the stadium on Saturday). Accordingly, by analyzing this information, the service may be able to determine the types of music a user prefers, a particular artist a user prefers, or the like. Further, in some exemplary embodiments, event information may be captured via a user purchase of electronic tickets on the Internet.

Additionally, to learn the user's musical preferences, a client application running on, for example, the user's mobile terminal may collect information on the songs played by the user and upload this information (e.g., artist, album, track title) to the service, which may allow the service to build a profile of the user's musical taste. A similar type of client application and upload process may be utilized for any type of media item. In some exemplary embodiments, the service may be configured to request the user's permission to fetch information about the user (e.g., his preferences, profession, friends) from other services such as social networking websites, music downloading websites, or the like and generate a user profile based at least in part on this information.

Suitable POIs may be identified based at least in part on the user profile and possibly other criteria. In this regard, when identifying suitable POIs and thereby facilitating the designing a route for the user, the service may take into account the user preferences taken from the user profile. For example, if a user's profile indicates that the user is a sports fan, POIs that relate to sports and possibly the favorite sport of the user may deemed suitable POIs for inclusion in the route. Further, if the user profile indicates that the user prefers certain musical genres such as rock music, POIs that relate to that particular genre may be deemed suitable for inclusion in the route. Further, information provided via the user profile may indicate that a user owns a particular brand of automobile. A POI for the closest dealership for that type of automobile may be deemed a suitable POI.

Additionally, in some exemplary embodiments, business may enter into agreements with the service to have POIs associated with the business be deemed suitable POIs for inclusion in a route, based at least in part on a user profile. In this regard, the service may be configured to identify suitable POIs an include the suitable POIs for users having user profiles that meet certain predefined criteria. For example, the service may be configured to deem a POI associated with a brand-name car dealer as a suitable POI for users that have profiles indicating that the users prefer car of the same brand-name.

In some exemplary embodiments, suitable POIs may be identified based at least in part on information on the locations of a user's friends. For example, if some of a user's friends are currently visiting a record store, the POI associated with the store may be identified as a suitable POI, so that the user may meet his friend at the store. IN this manner, friends may become involved in a discussion about new albums and may increase the likelihood of making a purchase and/or make the user to like the service better.

POIs may also be deemed suitable based at least in part on the media item that will be accessed while the use is traveling the route. In some exemplary embodiments, the POIs for the route may be selected based at least in part on a characteristic of the media item (e.g., music style, podcast topic, etc.). Characteristics associated with each media item supported by the service, and characteristic associated with each POI supported by the service may be stored for access by the service and for comparison to select POIs related to the media item. For example, if the media item is a rock song, then POIs may be selected that are rock bars or restaurants that have a rock theme. Further, if the media item is a video or audio broadcast of a sporting event, then selected POIs may be sports bars, sports paraphernalia shops, and sports venues.

POIs may be defined at the service. In this regard, a financial arrangement may be entered into between the service and a business associated with a POI, in order to have the POI defined in the service and thereby made available for inclusion in a route. The financial funds acquired through the agreement may be used to cover licenses for use of the media items, data and roaming charges that may be incurred by the user while using the service, and other such costs. As such, the user's enjoyment of the media item may be funded by the businesses that are associated with the POIs. Further, in some exemplary embodiments, as an incentive for users to actually enter the businesses associated with the POIs, which may be determined, for example, through Bluetooth functionality included with the user's mobile device, the service may provide free media item downloads to users that enter the POIs. Further, the service may provide for activities that the may be conducted at various businesses associated with the POIs, such as test driving a car, and the service may provide various rewards if the user perform the activities.

With respect to selecting the media item to be accessed while the user travels the route, a user may select a media item type such as, a style, a genre, a topic, a theme, an artist, or the like for use in selecting the media item. As an example involving music media items, the media item types may be alternative, blues, classical, country, electronica and dance, folk, gospel, hip-hop and rap, jazz, latin, metal, new age, pop, reggae, rock, soul, rhythm and blues, and world music. The selection of a media item type may be made by the user on the user's mobile device and the mobile device may transmit the selection to the service. Accordingly, the service may select the media item based at least in part on the user's selection of the media item type. In some exemplary embodiments, the service may predict or recommend a media item type and possibly associated media items that may be preferable to a user based at least in part on the user's media playing history (which may have been uploaded to the service), and the route may be determined based at least in part on the predicted or recommended media item. Further, in other exemplary embodiments, the user may select the specific media item from, for example, an online catalog, rather than allow the service to select the media item.

The display 100 of FIG. 1 indicates the example route 110 that has been determined based at least in part on criteria as described above. Along the route 110, POI indicators 130 are displayed. The POI indicators may be displayed as symbols that also follow the theme associated with the media item.

In an example scenario associated with FIG. 1, a rock song has been identified as the media item to be accessed. As a result, the POIs that have been selected to determine the route may also have a rock aspect. As depicted in FIG. 1, the indications of POIs may use rock themed symbols for the indications of the POIs on the display. In this regard, POI indicator 130*a* may be a guitar store or a musical instruments shop as indicated by the guitar symbol. POI indicator 130*b* and 130*d* may be a rock bar as indicated by the symbol of the devil's horns sign. POI indicator 130*c* may be a rock clothing and apparel shop as indicated by the symbol of a rock t-shirt. POI indicator 130*e* may be a music or record shop as indicated by the symbol of a vinyl record. Examples of other POI indicators may be a disco ball for a discotheque, a pink shooting star for bars playing or otherwise associated with Top 40 hits and so on.

In some exemplary embodiments, businesses associated with a POI may purchase a unique POI indicator (e.g., a logo or trademark) from the service to be displayed on the maps of users. In some exemplary embodiments, user may modify the POI indicators by purchasing other POI indicators. In some exemplary embodiments, a user that enters a business associated with a POI may receive new POI indicator symbols for the POI associated with the business.

In some embodiments, the POI indicators may be selectable to access additional information associated with the underlying POI, such as address, phone number, web link, hours of operation, special offers, and other such information. Further, this information may be displayed when the user is located within a predefined proximity of the POI.

Further, when the mobile device and the associated user begin to travel along the route, the mobile device may be granted access to the media item to, in turn, play the media item. As long as the location information provided by the user's mobile device indicates that the user is traveling along the route, within a specified distance, the media item may continue to be accessed and played. As such, a user will be considered to be on the route in instances in which the user's mobile device remains within the specified distance of the predefined route. To access the media item, the mobile device may receive a communications stream including the media item. The communications stream may be halted if various rules for traveling along the route are not satisfied. Alternatively, in some embodiments, the media item may be downloaded to the mobile device, and access may granted through the use of an access key from the service, and an access confirmation that may be received by the mobile device in response to a location update.

If the location information provided by the user's mobile device indicates that the user has strayed from the route, various options for responding may be implemented. In some exemplary embodiments, playback of the media item may stop, or be paused until the user returns to the route. Additionally or alternatively, the mobile device may generate a notification, such as a sound. In some exemplary embodiments, the volume of the media item may lower as the user moves from the route, and rise as the user returns. In some exemplary embodiments, the audio balance (e.g., power to left or right speaker) may be altered to indicate to the user the direction the user should follow to return to the route. In some exemplary embodiments, the mobile device may inquire whether the user would prefer to be released from the service and play another media item outside of the service. In some exemplary embodiments, a new route may be generated with the current location used as the starting location while playing the same media item, another media item in the same media item type, a media item from another media item type, or a media item from a media item type selected by the user.

In some exemplary embodiments, the speed at which the user is traveling along the route may be tracked, for example through timed location updates. Based at least in part on the user's speed, additional media items may be accessed, for example in a situation where the route may not have been completed by the end of playback of a media item. Further, based at least in part on the user's speed, a list of media items to be played while the user travels the route may be altered.

In some exemplary embodiments, a user may be offered a plurality of routes to select from prior to traveling a route.

Figure 2:
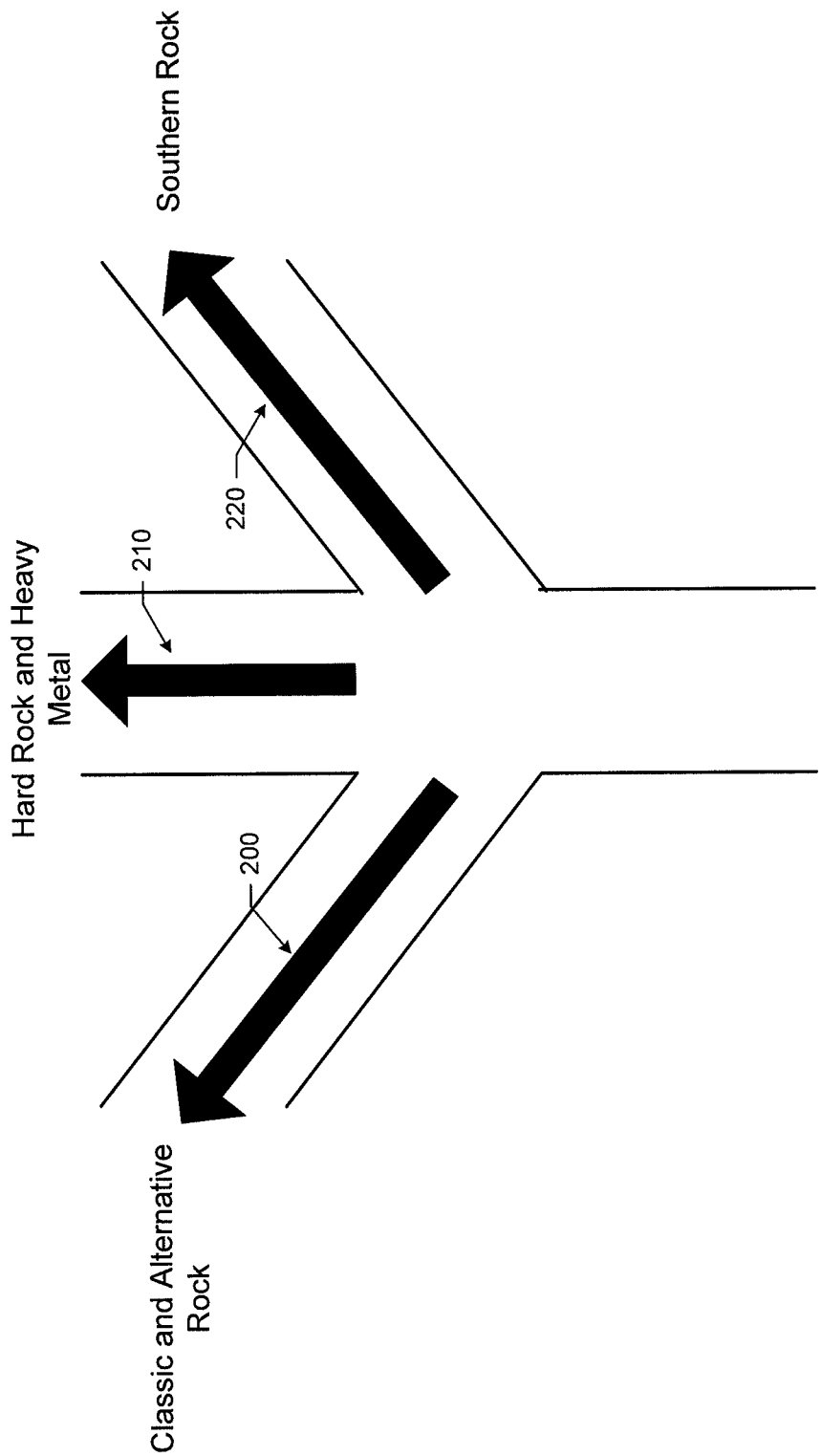
FIG. 2 illustrates a conceptual view of a plurality of routes having associated themes according to various exemplary embodiments of the present invention.

Each of the plurality of routes may be determined as described above. FIG. 2 depicts an illustration of a display that may be provided to a user that has selected rock as a media item type. The user has been provided an opportunity to select one of three separate routes. In the exemplary embodiment described by FIG. 2, each of the three routes is associated with different music within the rock media item type. The left route 200 is associated with classic and alternative rock music. The center route 210 is associated with hard rock or heavy metal music, and the right route 220 is associated with southern rock music.

In the example depicted in FIG. 2, if the user selects the left route, the user will hear classic and alternative rock from various artists that may be categorized as classic and alternative rock artists. If the user selects the center route 210, the user will hear hard rock and heavy metal from various artists that may be categorized as hard rock or heavy metal artists. Further, if the user selects the right route 220, the user will hear Southern rock from bands from various artists that may be categorized as Southern rock artists.

In some exemplary embodiments, a user may select a route by starting to travel along one of the routes. In this example, if the user starts to walk to the right, the right route 200, with Southern rock, may start to play.

The example display of FIG. 2 may also depict brand advertisements with the music for each selectable route (not depicted). The brand advertisements may be related to a common theme or other characteristic as the artists and media items for the route. For example, on the right route 220, the user is taken to a motorcycle dealer and then to a restaurant, both of which may be considered to have ties to Southern rock culture. As a result of the commonalities between the music and the places of business a target demographic may be subjected to marketing and advertisements. In this manner, the service may offer new types of advertising possibilities for record labels and for consumer service providers and goods manufacturers. In this regard, a record label for an artist, may also make a deal to advertise on all routes that pass all motorcycle shops of a particular franchise. On the other hand, a motorcycle shop may enter an agreement to have its POI on all routes that play Southern rock. Further, in some exemplary embodiments, the Southern rock music may also be associated with clothing and appeal shops which have a connection with Southern rock.

Figure 8:
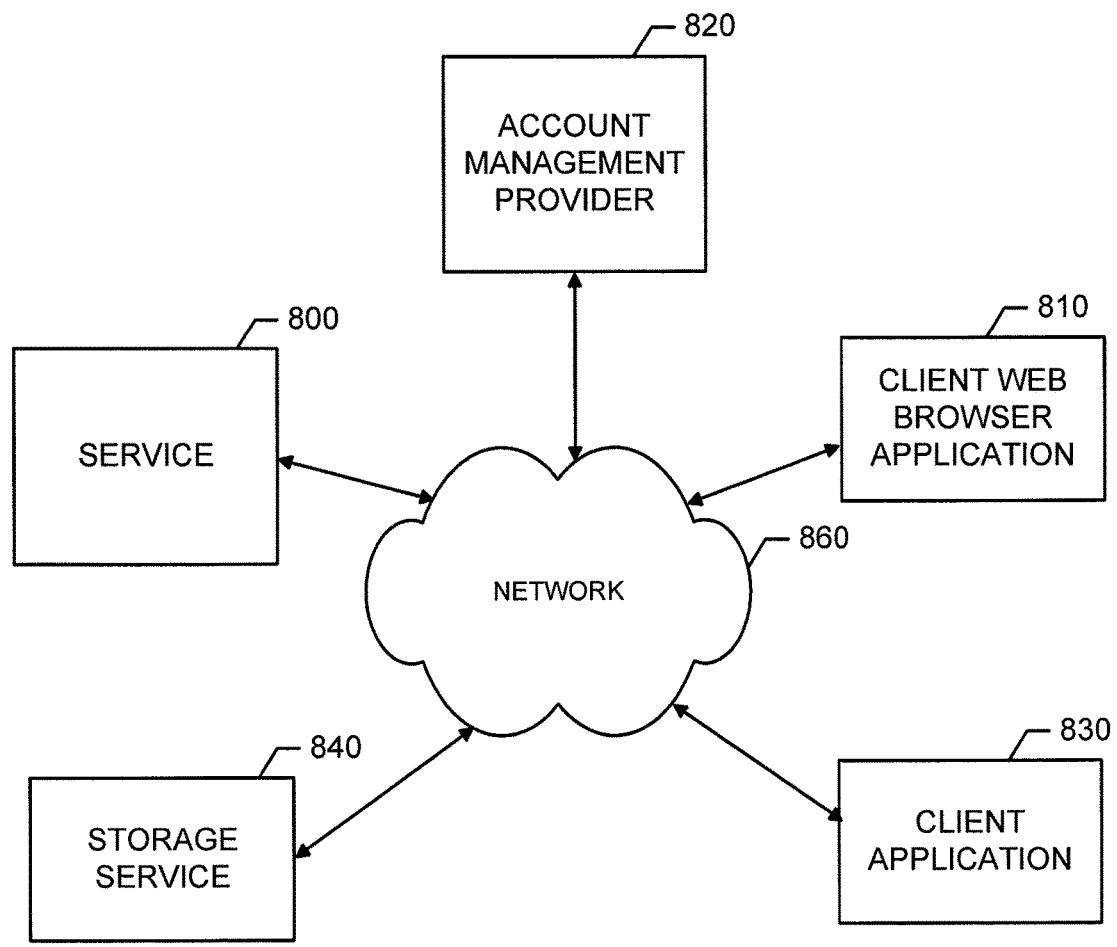
FIG. 8 is a schematic block diagram of a system according to an example embodiment of the present invention.

Referring now to FIG. 8, an embodiment of a system in accordance with an example embodiment of the present invention is illustrated. The system of FIG. 8 may include a service 800, a client web browser application 810, an account management provider 820, a client application 830, and a storage service 840. The service 800, the client web browser application 810, the account management provider 820, the client application 830, and the storage service 840 may be interconnected via the illustrated network 860. Furthermore, each of the service 800, the client web browser application 810, the account management provider 820, the client application 830, and the storage service 840 may be any device or means embodied in hardware, software or a combination of hardware and software configured for the performance of the corresponding functions of the service 800, the client web browser application 810, the account management provider 820, the client application 830, and the storage service 840, respectively, as described below.

In an example embodiment, the service 800, the account management provider 820, and the storage service 840, which may include memory, may collectively represent and/or employ an Internet or network service (e.g., a website, a social networking website, a blog website, a web feed, a widget, a service platform, a server, and/or the like) that may receive and interact with communications to/from users via the client application 830 and/or the client web browser application 810. Various types of content, such as, but not limited to, music, audio, videos, pictures, other media items, maps, games, data files, books, text, journals, documents, messages, user profile information, privacy options, television/radio programs or channels, internet sites or links, and/or the like, may be synchronized with and/or otherwise transferred to and from, the service 800. The service 800 may also enable users to transact business to acquire content via the service 800. In some cases the service 800 may enable users to utilize the storage service 840 for storage and retrieval of content by the service 800. According to various embodiments, the service 800 may be configured to perform the functionality described above to identify suitable POIs, determine a route, and provide access to a media item based at least in part on current location information of a user with respect to the route.

The account management provider 820 may operate together with the various other network entities to perform account management and security features. In some embodiments, login information and passwords are first directed to the account management provider 820 for verification. Upon verification, the account management provider 820 may provide access to, and allow communications between, various network entities using, for example, a token or other access key.

Client application 830 may be an application residing and operating on a platform (e.g., a user platform), such as a computer, mobile terminal, and/or the like, that may be used to interact with the service 800. The client application 830 may be downloaded to and/or installed on the platform. In some embodiments, the client application 830 may be specifically tailored to interact with the service 800, that is, the client application 830 may be a dedicated application. Via the client application 830, the platform, and the user of the platform, may interact with the service 800 to send, receive, and/or modify, as well as synchronize, content between the client application 830 and the service 800. The client application 830 may facilitate the gathering and storage of content, such as user profile information for subsequent transmission to the service 800.

Similar to the client application 830, the client web browser application 810 may be an application residing and operating on a platform (e.g., a user platform), such as a computer, mobile terminal, and/or the like, that may be used to interact with the service 800. In this regard, the client web browser application 810 may be a generic network communication application for interacting with various network entities, including the service 800. Via the client web browser application 810, a platform, and the user of the platform, may interact with the service 800 to send, receive, and/or modify, as well as synchronize, data between the client web browser application 810 and the service 800. The client web browser application 810 may facilitate the gathering and storage of selections of privacy options and other data for subsequent transmission to the service 800.

In an example embodiment, the service 800 may provide users accessing the service 800 via the client application 830 or the client web browser application 810 with access to various content, including routes and media items, as well as other content as described herein. In some situations, a user may search for or otherwise access specific content desired by the user. In other situations, the user may receive content from other users or even network entities on a solicited or unsolicited basis.

According to some embodiments of the present invention, the service 800 (or the device of the user (e.g., via the client web browser application 810 or the client application 830)) may provide for performing the functionality as described above. The service 800 or the device of the user may be configured to identify suitable POIs, determine a route, and provide access to a media item based at least in part on current location information of a user with respect to the route as described herein.

Figure 3:
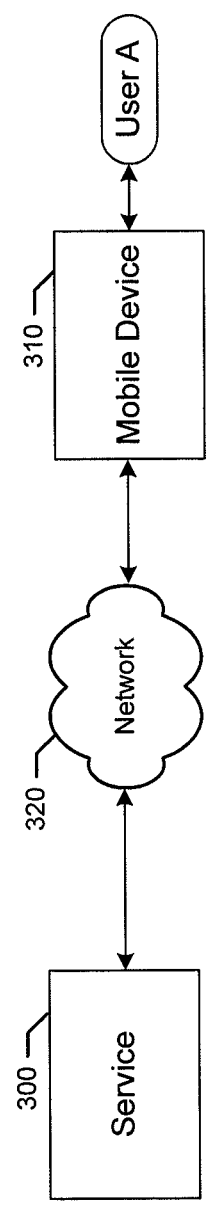
FIG. 3 illustrates a communications system and associated network entities that may interact to perform operations in accordance with various exemplary embodiments of the present invention.
Figure 4:
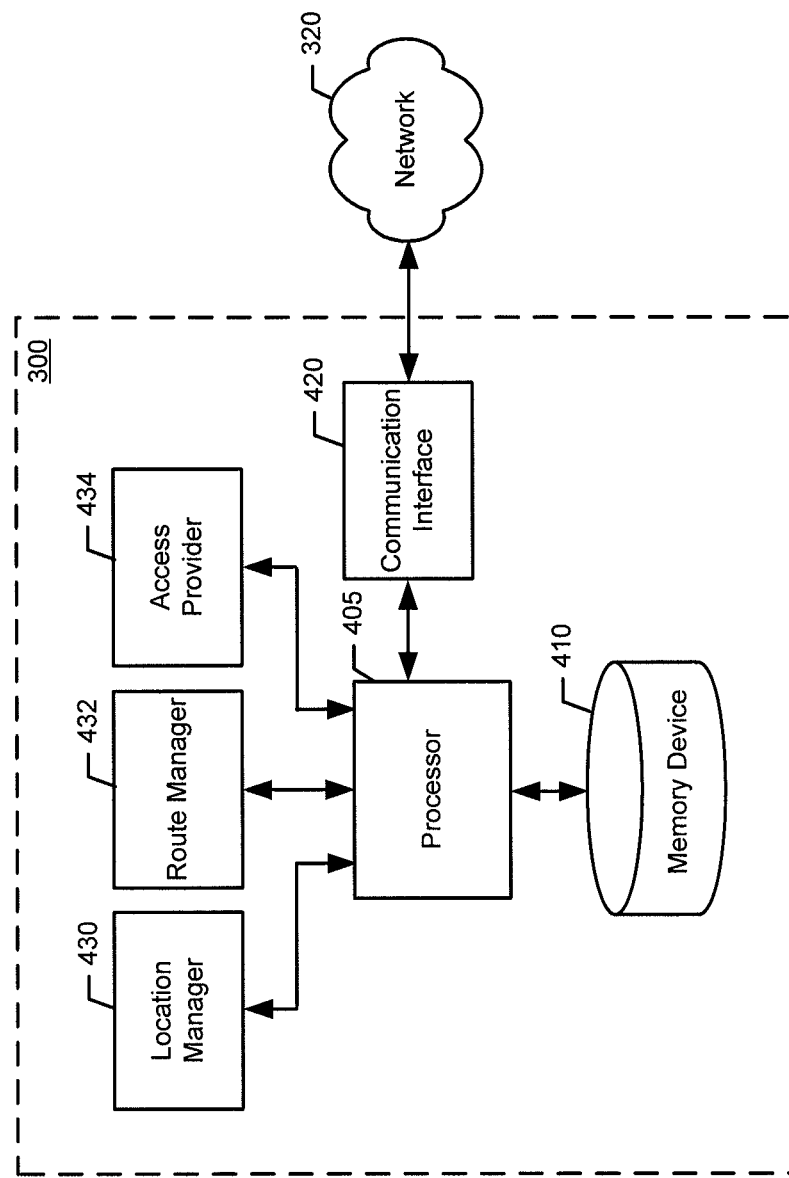
FIG. 4 illustrates a block diagram of a service apparatus for providing access to a media item based at least in part on a route according to various exemplary embodiments of the present invention.
Figure 5:
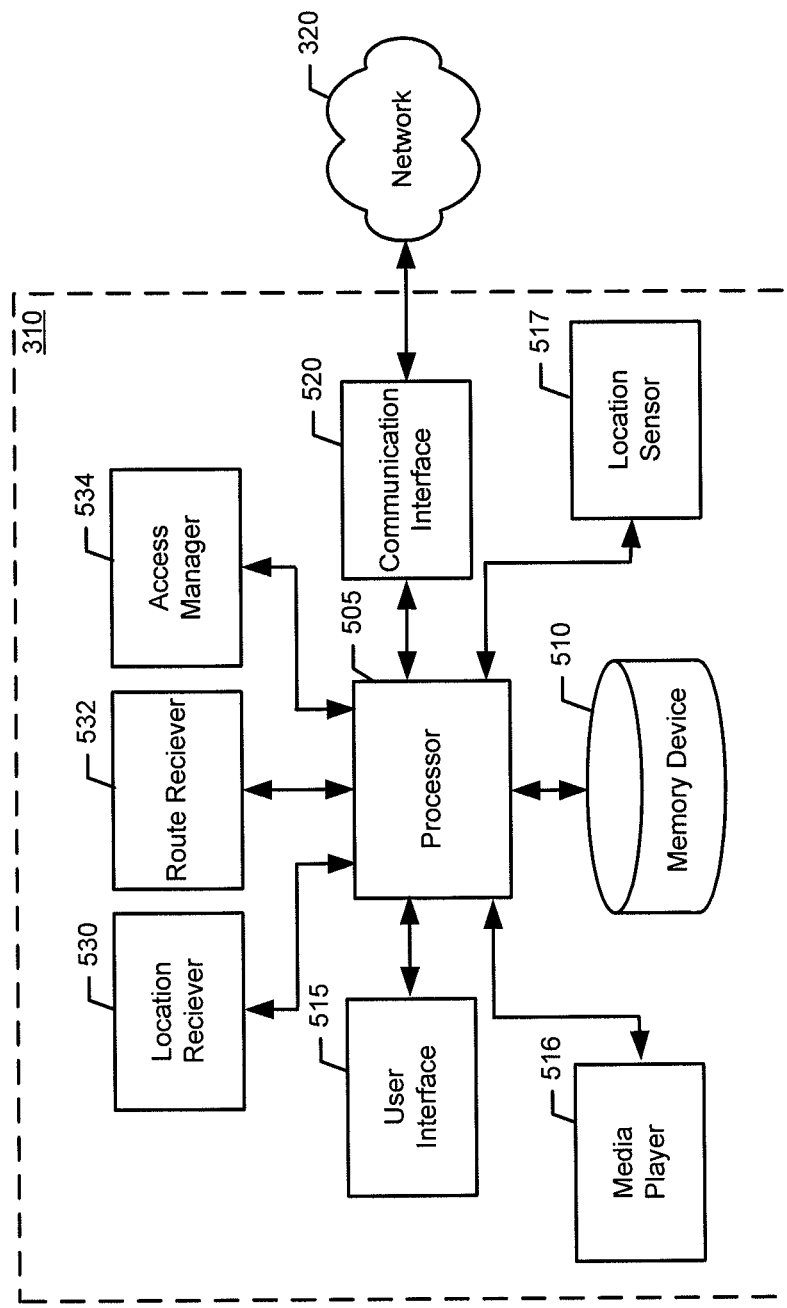
FIG. 5 illustrates a block diagram of a mobile device apparatus for providing access to a media item based at least in part on a route according to various exemplary embodiments of the present invention.

FIGS. 3-7 depict various exemplary methods, apparatuses, and computer program products for providing access to a media item based at least in part on a route as described herein. FIG. 3 illustrates a communications system and associated network entities that may interact to perform operations in accordance with various exemplary embodiments of the present invention. The communications system includes a service 300, a mobile device 310, and a network 320. FIG. 4 illustrates a more detailed depiction of an example embodiment of the service 300, and FIG. 5 illustrates a more detailed depiction of an example embodiment of the mobile device 310.

The service 300 of may be configured to perform some or all of the functionality described with respect to service 800. The mobile device 310 may be configured to implement various functionality as described herein including the functionality of the client web browser application 810 and/or the client application 130. The network 320 may be any type of wired and/or wireless communications network.

FIG. 4 illustrates an exemplary service 200 that may provide access to a media item based at least in part on a route in accordance with various exemplary embodiments of the present invention. The service 300 may be embodied as, or included as a component of, a computing device such as any type of wired or wireless communications device, such as, for example, a mobile terminal such as, a mobile telephone, a portable digital assistant (PDA), a pager, a mobile television, a gaming device, a mobile computer, a laptop computer, a camera, a video recorder, an audio/video player, a radio, and/or a global positioning system (GPS) device, a network entity such as an access point such as a base station, or any combination of the aforementioned, or the like. Further, the service 300 may be configured to implement various embodiments of the present invention as described herein including, for example, various exemplary methods of embodiments of the present invention, where the methods may be implemented by means of a hardware or software configured processor, computer-readable medium, or the like.

The service 300 may include or otherwise be in communication with a processor 405, a memory device 410, and a communication interface 420. In some embodiments, the service 300 may also include a user interface. The processor 405 may be embodied as various means including, for example, a microprocessor, a coprocessor, a controller, or various other processing devices including integrated circuits such as, for example, an ASIC (application specific integrated circuit), an FPGA (field programmable gate array), or a hardware accelerator. In an exemplary embodiment, the processor 405 may be configured to execute instructions stored in the memory device 410 or instructions otherwise accessible to the processor 405. Processor 405 may also be configured to facilitate communications via the communications interface 420 by, for example, controlling hardware and/or software included in the communications interface 420.

The memory device 410 may be a computer-readable storage medium that may include volatile and/or non-volatile memory. For example, memory device 410 may include Random Access Memory (RAM) including dynamic and/or static RAM, on-chip or off-chip cache memory, and/or the like. Further, memory device 410 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 410 may include a cache area for temporary storage of data. In this regard, some or all of memory device 410 may be included within the processor 405.

Further, the memory device 410 may be configured to store information, data, applications, computer-readable program code instructions, or the like for enabling the processor 405 and the service 300 to carry out various functions in accordance with exemplary embodiments of the present invention. For example, the memory device 410 could be configured to buffer input data for processing by the processor 405. Additionally, or alternatively, the memory device 410 may be configured to store instructions for execution by the processor 405.

The communication interface 420 may be any device or means embodied in either hardware, software, or a combination of hardware and software that is configured to receive and/or transmit data from/to a network and/or any other device or module in communication with the service 300. In this regard, the communication interface 420 may include, for example, an antenna, a transmitter, a receiver, a transceiver and/or supporting hardware, including a processor or software for enabling communications with network 320. Via the communication interface 420 and the network 320, the service 300 may communicate with various other network entities.

The communications interface 420 may be configured to provide for communications in accordance with any wired or wireless communication standard. For example, communications interface 420 may be configured to provide for communications in accordance with second-generation (2G) wireless communication protocols IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, communications interface 320 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like.

Location manager 430, route manager 432, and access provider 434 of service 300 may be any means or device embodied in hardware, software, or a combination of hardware and software, such as processor 405 implementing software instructions or a hardware configured processor 405, that is configured to carry out the functions of location manager 430, route manager 432, and/or access provider 434 as described herein. In an exemplary embodiment, the processor 405 may include, or otherwise control the location manager 430, route manager 432, and/or access provider 434. In various exemplary embodiments, location manager 430, route manager 432, and/or access provider 434 may reside on differing apparatuses such that some or all of the functionality of the location manager 430, route manager 432, and/or access provider 434 may be performed by a first apparatus, and the remainder of the functionality of location manager 430, route manager 432, and/or access provider 434 may be performed by one or more other apparatuses.

Location manager 430 may be configured to receive a start location of a mobile device. In this regard, location manager 430 may be configured to receive location information in the form of longitude and latitude, or the like, associated with the current location of a mobile device. The location information may be received via the communications interface 420 and the network 320.

Route manager 432 may be configured to receive a route. In this regard, the route may have been determined based at least in part on POIs and the start location as described above. In some exemplary embodiments, route manager 432 may be configured to determine the route and receive the route as a result. In this regard, the route manager 432 may be configured to identify suitable POIs which may have been previously stored in a manner accessible to route manager 432, such as in memory device 410. Route manager 432 may implement any known mechanism for receiving locational inputs, in the form of, for example, a start location, and end location, and/or intermediate destination locations (e.g., suitable POIs) to determine a route. In some exemplary embodiments, the route manager may receive a route, and transmit only the suitable POIs associated with the route to a mobile device, and allow the mobile device to recreate the route based at least in part on the suitable POIs.

Route manager 432 may identify various criteria by which to select suitable POIs as described above. For example, route manager 432 may identify suitable POIs based at least in part on a media type selection. In this regard, route manager 432 may be configured to receive the media type selection via, for example, communication interface 420 and network 320 from a mobile device and select a media item in accordance with the media item type selection. Further, route manager 432 may be configured to determine the route based at least in part on characteristics of a media item. In this regard, the characteristics of a media item, possibly selected by the route manager 432 in accordance with the media type selection, may be compared to characteristics of the POIs to identify suitable POIs. The POIs that have a common characteristic with the media item may be suitable POIs. The suitable POIs may be used to determine the route.

Route manager 432 may also be configured to determine and provide for selection of a plurality of routes. Each route in the plurality of routes may be determined based at least in part on a different set of suitable POIs. Further, each route within the plurality of routes may be associated with a different media item.

Route manager 432 may also be configured to define POIs. Defined POIs may be stored in a manner that allows the route manager 432 to access the POIs, such as in the memory device 410. In this regard, the POIs may be defined in response to advertising being sold in association with the POIs as described above.

Access provider 434 may be configured to provide for access to a media item if a current location of the mobile device remains on the route. In this regard, the access provider 434 may be configured to receive location information updates from a mobile device. Access provider 434 may be configured to analyze the updated location information and determine whether the location information describes a location on the route or a location off the route. If the updated location is on the route, the access provider may be configured to provide access to the media item. In this regard, access to the media item may be provided through a streaming communications session or an updated access key. If the updated location is off the route, then the access provider 434 may be configured to revoke access to the media item or respond in the other exemplary manners described above.

As depicted in FIG. 3, the service 300 may communicate with the mobile device 310 via the network 320. An exemplary conceptual architecture of mobile device 310 may be described by referring to FIG. 5. FIG. 5 illustrates an exemplary mobile device 310 that may provide access to a media item based at least in part on a route. According to various exemplary embodiments of the present invention, the mobile device 310 may be embodied as, or included as a component of, any type of wired or wireless communications device, such as, for example, a mobile terminal such as, a mobile telephone, a portable digital assistant (PDA), a pager, a mobile television, a gaming device, a mobile computer, a laptop computer, a camera, a video recorder, an audio/video player, a radio, and/or a global positioning system (GPS) device, or any combination of the aforementioned, or the like. Further, the mobile device 310 may be configured to implement various embodiments of the present invention as described herein including, for example, various exemplary methods of embodiments of the present invention, where the methods may be implemented by means of a hardware or software configured processor, computer-readable medium, or the like.

The mobile device may include or otherwise be in communication with a processor 505, a memory device 510, a communication interface 520, a user interface 515, a media player 516, and a position sensor 517. The processor 505 may be embodied as various means including, for example, a microprocessor, a coprocessor, a controller, or various other processing devices including integrated circuits such as, for example, an ASIC (application specific integrated circuit), an FPGA (field programmable gate array), or a hardware accelerator. In an exemplary embodiment, the processor 505 may be configured to execute instructions stored in the memory device 510 or instructions otherwise accessible to the processor 505. Processor 505 may also be configured to facilitate communications via the communications interface 520 by, for example, controlling hardware and/or software included in the communications interface 520.

The memory device 510 may be a computer-readable storage medium that may include volatile and/or non-volatile memory. For example, memory device 510 may include Random Access Memory (RAM) including dynamic and/or static RAM, on-chip or off-chip cache memory, and/or the like. Further, memory device 510 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 510 may include a cache area for temporary storage of data. In this regard, some or all of memory device 510 may be included within the processor 505.

Further, the memory device 510 may be configured to store information, data, applications, computer-readable program code instructions, or the like for enabling the processor 505 and the mobile device to carry out various functions in accordance with exemplary embodiments of the present invention. For example, the memory device 510 could be configured to buffer input data for processing by the processor 505. Additionally, or alternatively, the memory device 510 may be configured to store instructions for execution by the processor 505.

The communication interface 520 may be any device or means embodied in either hardware, software, or a combination of hardware and software that is configured to receive and/or transmit data from/to a network and/or any other device or module in communication with the mobile device. In this regard, the communication interface 520 may include, for example, an antenna, a transmitter, a receiver, a transceiver and/or supporting hardware, including a processor or software for enabling communications with network 320. Via the communication interface 520 and the network 320, the mobile device may communicate with various other network entities.

The communications interface 520 may be configured to provide for communications in accordance with any wired or wireless communication standard. For example, communications interface 520 may be configured to provide for communications in accordance with second-generation (2G) wireless communication protocols IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, communications interface 520 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, Bluetooth (BT), ultra wideband (UWB) and/or the like.

The user interface 515 may be in communication with the processor 405 to receive user input at the user interface 515 and/or to provide output to a user as, for example, audible, visual, mechanical or other output indications. The user interface 515 may include, for example, a keyboard, a mouse, a joystick, a display (e.g., a touch screen display), a microphone, a speaker, or other input/output mechanisms. In some exemplary embodiments, the user interface 515 may be limited, or even eliminated.

The media player 516 may be configured to facilitate playing media items on the mobile device. In an exemplary embodiment, the processor 505 may include, or otherwise control the media player 516. The media player 516 may be configured to receive a media item, such as in the form of a data file, from memory device 510, the service 300, or another mobile device, and play the media item. In some exemplary embodiments, media player 516 may be configured to receive a media item as a data stream from, for example the service 300 or another user terminal, and play the media item. The media item may be played by controlling the user interface 515 to allow a user to experience the media item. For example, the media player 516 may be configured to receive a music track, and play the music track through speakers included in the user interface 515. The media player 516 may also be configured to receive a playlist, and play media items in accordance with the playlist.

The mobile device 310 may further include a location sensor 517 such as, for example, a global positioning system (GPS) module in communication with the processor 505. The location sensor 517 may be any means including any device or circuitry for determining the location of mobile device 310. The location sensor 517 may include all hardware for locating the location of a mobile device 517. Alternatively or additionally, the location sensor 517 may utilize a memory device, such as memory device 510 to store instructions for execution by the processor 505 in the form of software necessary to determine the location of the mobile device 517. Although the location sensor 517 of this example may be a GPS module, the location sensor 517 may include or otherwise alternatively be embodied as, for example, an assisted global positioning system (Assisted-GPS) sensor, or a location client, which may be in communication with a network device to receive and/or transmit information, such as a sky or floor sensor, for use in determining a location of the mobile device 517. In this regard, the location of the mobile device 517 may be determined by GPS, as described above, cell ID, signal triangulation, or other mechanisms as well. In one exemplary embodiment, the location sensor 517 includes a pedometer or inertial sensor. As such, the location sensor 517 may be capable of determining a location of the mobile device 517, with respect to, for example, longitude, latitude and altitude of the mobile device 310, or a location relative to a reference point such as a destination or start point. Information from the location sensor 517 may then be communicated to memory device 510 or to another memory device to be stored as a location history or location information. Additionally, the location sensor 517 may be capable of utilizing the processor 505 to transmit/receive, via communication interface 520, location information such as the current location of the mobile device 310.

Location receiver 530, route receiver 532, and access manager 534 of mobile device 310 may be any means or device embodied in hardware, software, or a combination of hardware and software, such as processor 505 implementing software instructions or a hardware configured processor 505, that is configured to carry out the functions of location receiver 530, route receiver 532, and/or access manager 534 as described herein. In an exemplary embodiment, the processor 505 may include, or otherwise control the location receiver 530, route receiver 532, and/or access manager 534. In various exemplary embodiments, the location receiver 530, route receiver 532, and/or access manager 534 may reside on differing apparatuses such that some or all of the functionality of the location receiver 530, route receiver 532, and/or access manager 534 may be performed by a first apparatus, and the remainder of the functionality of the location receiver 530, route receiver 532, and/or access manager 534 may be performed by one or more other apparatuses.

The location receiver 530 may be configured to receive a start location of the mobile device. In this regard, the location receiver may receive the start location from the position sensor 517. In some exemplary embodiments, location receiver 530 may be configured to receive the start location and provide for transmitting the start location to the service 300 via the communications interface 520 and the network 320.

The route receiver 532 may be configured to receive a route. In this regard, the route may have been determined based at least in part on POIs and the start location. In some exemplary embodiments, the route receiver 532 may be configured to receive a route from the service 300, the route having been determined by the service 300. In other exemplary embodiments, route receiver 532 may be configured to receive a plurality of suitable POIs from the service 300. Based at least in part on the plurality of suitable POIs, the route receiver 532 may be configured to determine a route and thereby receive the route. In some exemplary embodiments, the route receiver 532 may also be configured to provide for displaying the route and POI indicators, such as in accordance with display 100, on a display, such as the display of user interface 515.

The access manager 534 may be configured to provide for access to a media item if a current location of the mobile device remains on the route. In this regard, the access manager 534 may be configured to receive location information updates from location sensor 517. Access manager 534 may be configured to analyze the updated location information and determine whether the location information describes a location on the route or a location off the route. If the updated location is on the route, the access manager 534 may be configured to provide access to the media item. In this regard, access to the media item may be provided through a streaming communications session or an updated access key. If the updated location is off the route, then the access manager 534 may be configured to revoke access to the media item or respond in the other exemplary manners described above. In some exemplary embodiments, access manager 534 may be configured to provide the current location of the mobile device 310 to the service 300, and the service 300 may grant or deny access, or otherwise respond based at least in part on the current location.

In some exemplary embodiments, the access manager 534 may be configured to provide for displaying information associated with the POIs on the route. In this regard, the access manager may be configured to display information associated with a POI if the current location is within a threshold proximity of the POI or as otherwise described above.

Figure 6:
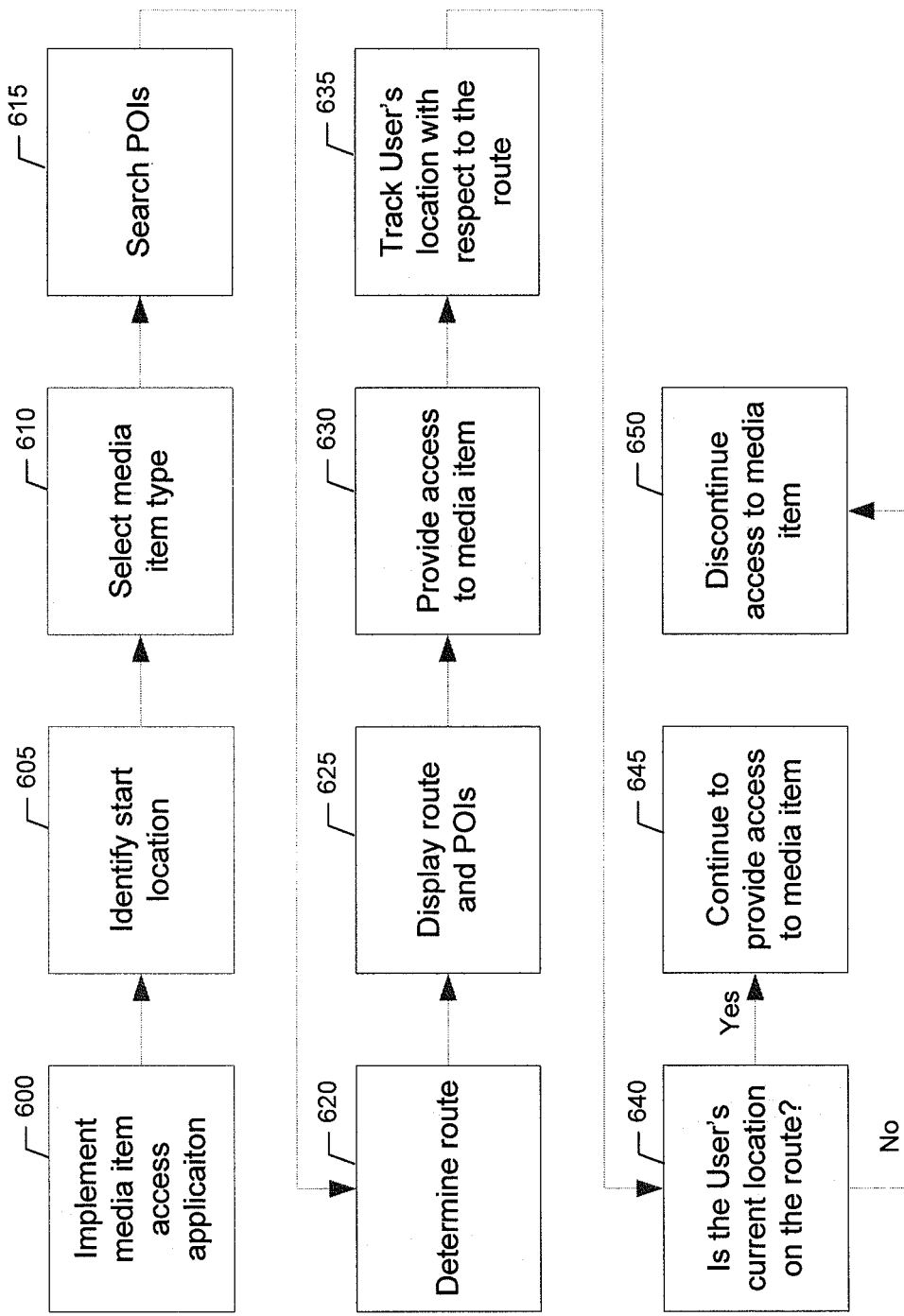
FIGS. 6 and 7 are flowcharts of an exemplary method for providing access to a media item based at least in part on a route according to various exemplary embodiments of the present invention.
Figure 7:
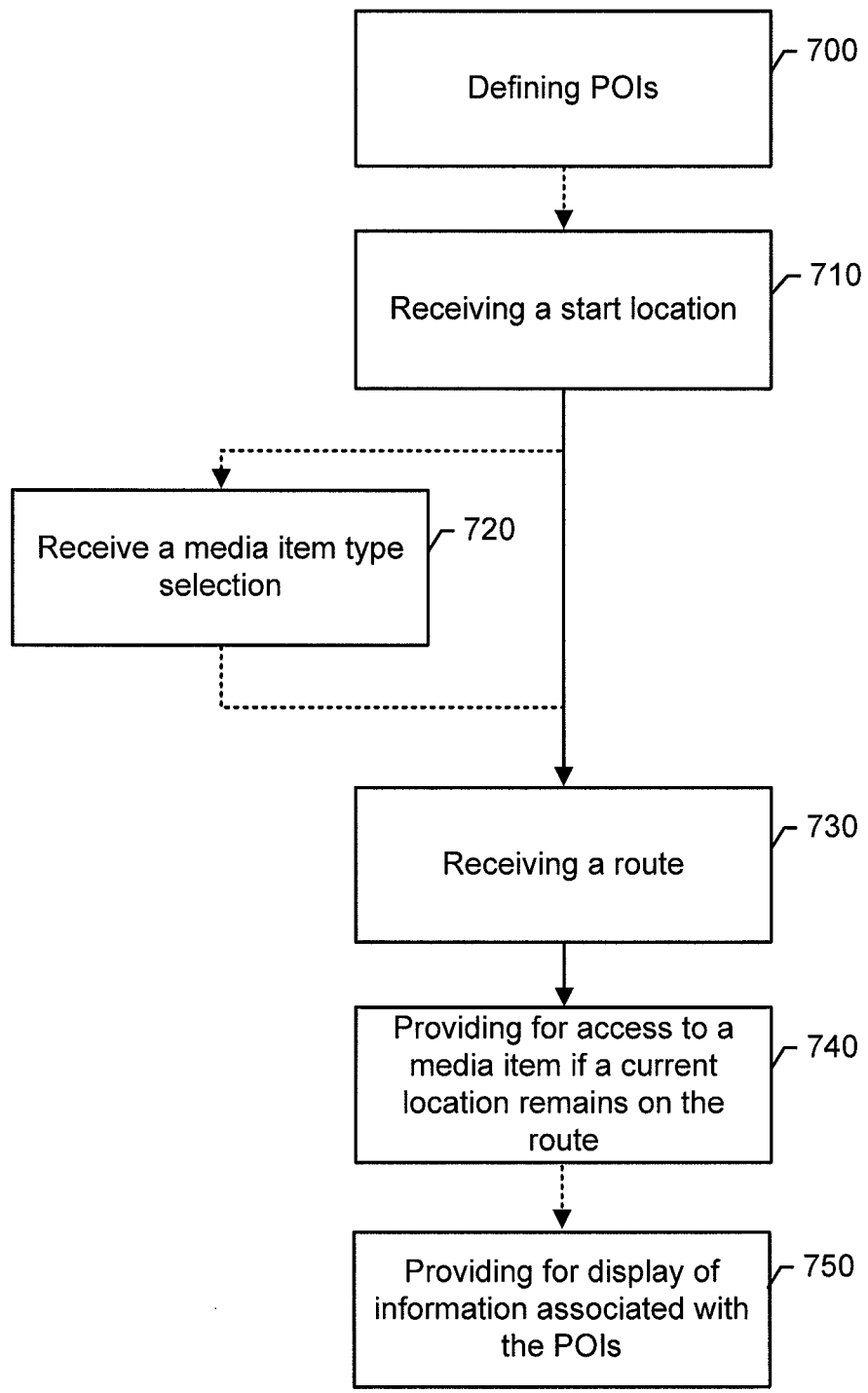

FIGS. 6 and 7 illustrate flowcharts of a system, method, and computer program product according to exemplary embodiments of the invention. It will be understood that each block, step, or operation of the flowcharts, and/or combinations of blocks, steps, or operations in the flowcharts, can be implemented by various means. Means for implementing the blocks, steps, or operations of the flowchart, and/or combinations of the blocks, steps or operations in the flowcharts may include hardware, firmware, and/or software including one or more computer program code instructions, program instructions, or executable computer-readable program code instructions. In one exemplary embodiment, one or more of the procedures described herein may be embodied by program code instructions. In this regard, the program code instructions which embody the procedures described herein may be stored by or on a memory device, such as memory device 410 or 510, of an apparatus, such as service 300 or mobile device 310, and executed by a processor, such as the processor 405 or 505. As will be appreciated, any such program code instructions may be loaded onto a computer or other programmable apparatus (e.g., processor 405 or 505, memory device 410 or 510) to produce a machine, such that the instructions which execute on the computer or other programmable apparatus create means for implementing the functions specified in the flowcharts' block(s), step(s), or operation(s). These program code instructions may also be stored in a computer-readable storage medium that can direct a computer, a processor, or other programmable apparatus to function in a particular manner, such that the instructions stored in the computer-readable storage medium produce an article of manufacture including instruction means which implement the function specified in the flowchart's block(s), step(s), or operation(s). The program code instructions may also be loaded onto a computer, processor, or other programmable apparatus to cause a series of operational steps to be performed on or by the computer, processor, or other programmable apparatus to produce a computer-implemented process such that the instructions which execute on the computer, processor, or other programmable apparatus provide steps for implementing the functions specified in the flowcharts' block(s), step(s), or operation(s).

Accordingly, blocks, steps, or operations of the flowcharts support combinations of means for performing the specified functions, combinations of steps for performing the specified functions, and program code instruction means for performing the specified functions. It will also be understood that one or more blocks, steps, or operations of the flowcharts, and combinations of blocks, steps, or operations in the flowcharts, can be implemented by special purpose hardware-based computer systems which perform the specified functions or steps, or combinations of special purpose hardware and program code instructions.

FIG. 6 depicts a flowchart describing an exemplary method of one embodiment of the present invention for providing access to a media item based at least in part on a route. In this regard, at 600, the method may include implementing a media item access application. The media item access application may be implemented on both the service and the mobile device. At 605, a start location may be identified. The start location may be identified by a location sensor on a mobile device. In some exemplary embodiments, the start location may be provided to a service. At 610, a media item type may be selected. In some exemplary embodiments, the media item type may be selected by a user or the media item type may be selected, such as automatically by either the service or the mobile device.

At 615, POIs may be searched. The POIs may be searched to identify suitable POIs based at least in part on various criteria. At 620, a route may be determined. The route may be determined based at least in part on at least the start location and the suitable POIs. At 625, the route may be displayed with the POIs. The route and POIs may be displayed by the user interface of the mobile device. At 630, access may be provided to the media item. At 635, the user's location may be tracked, via for example, location information updates, with respect to the route. A determination may be made at 640 as to whether the user's current location is on the route. If the user's current location is on the route, access to the media item may continue at 645. If the user's current location is off the route, access to the media item may be discontinued.

FIG. 7 illustrates a flowchart describing exemplary methods of one embodiment of the present invention for providing access to a media item based at least in part on a route. According to various embodiments, at 700, POIs may be defined. In this regard, at least one POI may be defined in response to advertising being sold in association with the at least one POI. At 710, a method may include receiving a start location. In this regard, the start location may the location of a mobile device. Further, at 720, a media item type may be selected.

In various embodiments, at 730, a route may be received. In this regard, the route may have been determined based at least in part on POIs and the start location. The route may have also been determined based at least in part on POIs that were selected in accordance with a media item type selection. Further, in some exemplary embodiments, the media item may also be selected based at least in part on the media item type selection. In some exemplary embodiments, at least some of the POIs used to determine the route may have a characteristic in common with the media item. In this regard, the route may have been determined based at least in part on the characteristics of the media item. Moreover, in some exemplary embodiments, the received route may have been selected from a plurality of routes. In this regard, each route in the plurality of routes may have been determined based at least in part on a different set of POIs, and each route in the plurality of routes may be associated with different media items.

At 740, exemplary methods may include providing for access to a media item if a current location of the mobile device remains on the route. At 750, some exemplary methods may include providing for a display of information associated with the POIs.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
   determining at least one start location and at least one destination location for at least one mobile device;
   determining a plurality of routes between the at least one start location and the at least one destination location based, at least in part, on one or more points of interest (POIs);
   initiating a presentation of the plurality of routes in at least one user interface of the at least one mobile device;
   selecting at least one route from the plurality of routes based, at least in part, on user preference information, user selection, or a combination thereof; and
   suspending access to one or more media items based, at least in part, on determining that the at least one mobile device is outside the at least one selected route, wherein the suspension of access includes stopping or pausing the one or more media items, reducing volume of the one or more media items, or a combination thereof.

2. A method of claim 1, wherein the plurality of routes are associated with the one or more media items.

3. A method of claim 1, further comprising:
   providing access to the one or more media items based, at least in part, on a current location of at least one user with respect to the at least one route.

4. A method of claim 1, wherein the presentation of the plurality of routes comprises presentation of one or more symbols of the POIs, and wherein each of the one or more symbols depicts a theme associated with a respective POI.

5. A method of claim 1, further comprising:
   determining the at least one mobile device is outside the at least one selected route;
   determining at least one new route based, at least in part, on the current location of the at least one mobile device; and
   generating a playlist of the one or more media items, wherein the playlist of the one or more media items includes at least one new media item similar to the current media item type, at least one new media item from another media item type, at least one new media item from a media item type selected by the at least one user, or a combination thereof.

6. A method of claim 5, wherein the one or more media items played within the at least one selected route is continued to be played in the at least one new route.

7. A method of claim 1, further comprising:
   determining the one or more POIs based, at least in part, on proximity information, temporal information, user profile information, form of travel, location information of at least one other user, or a combination thereof.

8. A method of claim 2, further comprising:
   determining the one or more media items based, at least in part, on user preference information, speed information, or a combination thereof.

9. A method of claim 1, wherein the one or more media items comprises an audio content, a visual content, or a combination thereof, and wherein the at least one route is selected further based on a time amount for the user to travel the at least one route, one or more operating hours of the respective POI, one or more durations of the associated one or more media items, or a combination thereof.

10. A method of claim 9, further comprising:
    tracking a speed that the user is travelling along the at least one route; and at least one of:
    providing access to additional one or more media items to the user when the user finishes accessing the associated one or more media items before reaching a destination location of the at least one route, and
    altering the associated one or more media items to one or more other media items based, at least in part, on the speed,
    wherein the one or more POIs comprises public buildings, place of business, residential areas, landmarks, parks, scenic locations, or a combination thereof.

11. An apparatus comprising:

at least one processor; and at least one memory including computer program code for one or more programs, the at least one memory and the computer program code configured to, with the at least one processor, cause the apparatus to perform at least the following;

determine at least one start location and at least one destination location for at least one mobile device;

determine a plurality of routes between the at least one start location and the at least one destination location based, at least in part, on one or more points of interest (POIs);

initiate a presentation of the plurality of routes in at least one user interface of the at least one mobile device;

select at least one route from the plurality of routes based, at least in part, on user preference information, user selection, or a combination thereof; and suspend access to one or more media items based, at least in part, on determining that the at least one mobile device is outside the at least one selected route, wherein the suspension of access includes stopping or pausing the one or more media items, reducing volume of the one or more media items, or a combination thereof.

12. An apparatus of claim 11, wherein the plurality of routes are associated with the one or more media items.

13. An apparatus of claim 11, wherein the apparatus is further caused to:

provide access to the one or more media items based, at least in part, on a current location of at least one user with respect to the at least one route.

14. An apparatus of claim 13, wherein the presentation of the plurality of routes comprises presentation of one or more symbols of the POIs, and wherein each of the one or more symbols depicts a theme associated with a respective POI.

15. An apparatus of claim 11, wherein the apparatus is further caused to:

determine the at least one mobile device is outside the at least one selected route;

determine at least one new route based, at least in part, on the current location of the at least one mobile device; and generate a playlist of the one or more media items, wherein the playlist of the one or more media items includes at least one new media item similar to the current media item type, at least one new media item from another media item type, at least one new media item from a media item type selected by the at least one user, or a combination thereof.

16. An apparatus of claim 15, wherein the one or more media items played within the at least one selected route is continued to be played in the at least one new route.

17. An apparatus of claim 11, wherein the apparatus is further caused to:

determine the one or more POIs based, at least in part, on proximity information, temporal information, user profile information, form of travel, location information of at least one other user, or a combination thereof.

18. A non-transitory computer-readable storage medium carrying one or more sequences of one or more instructions which, when executed by one or more processors, cause an apparatus to at least perform the following steps:

determining at least one start location and at least one destination location for at least one mobile device;

determining a plurality of routes between the at least one start location and the at least one destination location based, at least in part, on one or more points of interest (POIs);

initiating a presentation of the plurality of routes in at least one user interface of the at least one mobile device;

selecting at least one route from the plurality of routes based, at least in part, on user preference information, user selection, or a combination thereof; and suspending access to one or more media items based, at least in part, on determining that the at least one mobile device is outside the at least one selected route, wherein the suspension of access includes stopping or pausing the one or more media items, reducing volume of the one or more media items, or a combination thereof.

19. A non-transitory computer-readable storage medium of claim 18, wherein the plurality of routes are associated with the one or more media items.

20. A non-transitory computer-readable storage medium of claim 18, wherein the apparatus is further caused to perform:

providing access to the one or more media items based, at least in part, on a current location of at least one user with respect to the at least one route.

* * * * *